(12) United States Patent
Cameron et al.

(10) Patent No.: US 9,151,492 B2
(45) Date of Patent: Oct. 6, 2015

(54) HEATING APPARATUS

(75) Inventors: Andrew M. Cameron, Tansley (GB); Kelly T. Visconti, Summit, NJ (US)

(73) Assignee: Linde Aktiengesellschaft, Munich (DE)

( * ) Notice: Subject to any disclaimer, the term of this patent is extended or adjusted under 35 U.S.C. 154(b) by 814 days.

(21) Appl. No.: 13/115,184

(22) Filed: May 25, 2011

(65) Prior Publication Data
US 2012/0214108 A1   Aug. 23, 2012

(51) Int. Cl.
*C21B 9/00*   (2006.01)
*F23C 9/00*   (2006.01)
*F23L 7/00*   (2006.01)

(52) U.S. Cl.
CPC ... *F23C 9/00* (2013.01); *C21B 9/00* (2013.01); *F23L 7/007* (2013.01); *F23C 2900/99001* (2013.01); *F23L 2900/07001* (2013.01); *Y02E 20/322* (2013.01); *Y02E 20/342* (2013.01); *Y02E 20/344* (2013.01)

(58) Field of Classification Search
CPC ............ C21B 5/00; C21B 5/001; C21B 5/06; C21B 7/00; C21B 9/00; C21C 5/30; F23N 2035/18; F23N 2037/08; F27D 17/00
USPC ....... 431/5, 12; 432/30, 40; 700/274; 75/379, 75/458, 464
See application file for complete search history.

(56) References Cited

U.S. PATENT DOCUMENTS

| | | | | |
|---|---|---|---|---|
| 2,598,735 A | * | 6/1952 | Webb | .............................. 75/464 |
| 3,153,532 A | | 10/1964 | Touzalin | |
| 3,458,307 A | * | 7/1969 | Kerschbaum et al. | .......... 75/464 |
| 3,460,934 A | | 8/1969 | Kelmar | |
| 3,536,455 A | * | 10/1970 | Bogdandy et al. | ............ 422/115 |
| 3,547,624 A | | 12/1970 | Gray | |
| 3,602,487 A | | 8/1971 | Johnson | |
| 3,857,672 A | * | 12/1974 | Reed et al. | ..................... 431/353 |
| 3,892,517 A | * | 7/1975 | Ebeling et al. | ................... 431/90 |
| 3,951,586 A | * | 4/1976 | Rutshtein et al. | ............... 432/30 |
| 4,043,541 A | * | 8/1977 | Sprunck | ........................ 266/268 |

(Continued)

FOREIGN PATENT DOCUMENTS

CN    1888083 A  *  1/2007
DE    26 09 799 B1    6/1977
(Continued)

OTHER PUBLICATIONS w/EP Search Report, Sep. 13, 2011.
(Continued)

*Primary Examiner* — Jorge Pereiro
(74) *Attorney, Agent, or Firm* — Joshua L. Cohen

(57) ABSTRACT

An apparatus for heating a blast furnace stove having a combustion region and a combustion gas outlet associated with the combustion region includes a source of lower calorific value fuel; a first pipeline for supplying the lower calorific value fuel to the combustion region; a source of air; a second pipeline for supplying the air to the combustion region; a source of oxidant comprising at least 85% by volume of oxygen; a third pipeline to supply the oxidant to the combustion region; a fourth pipeline communicating with the combustion gas outlet for conducting combustion gas away from the stove; and a fifth pipeline operable to recirculate combustion gas to the combustion region. The apparatus may operate in different modes according to which of the pipelines are placed in communication with the combustion region.

6 Claims, 3 Drawing Sheets

(56) References Cited

U.S. PATENT DOCUMENTS

| | | | |
|---|---|---|---|
| 4,047,937 A * | 9/1977 | Kolb et al. | 75/379 |
| 4,127,257 A * | 11/1978 | Muller et al. | 266/44 |
| 4,169,700 A | 10/1979 | Yoshioka et al. | |
| 4,444,555 A * | 4/1984 | Edwardsen et al. | 432/30 |
| 4,488,869 A * | 12/1984 | Voorheis | 431/352 |
| 4,576,570 A * | 3/1986 | Adams et al. | 431/12 |
| 5,660,542 A * | 8/1997 | Rinker et al. | 432/19 |
| 6,247,315 B1 * | 6/2001 | Marin et al. | 60/672 |
| 6,436,337 B1 | 8/2002 | Gross | |
| 6,464,928 B1 * | 10/2002 | Lipukin et al. | 266/148 |
| 7,232,542 B2 * | 6/2007 | Friedrich et al. | 266/44 |
| 7,396,228 B2 * | 7/2008 | Tanabe et al. | 431/12 |
| 2009/0061366 A1 * | 3/2009 | Rosen et al. | 431/12 |
| 2009/0229416 A1 | 9/2009 | Cameron et al. | |
| 2010/0081098 A1 | 4/2010 | D'Agostini et al. | |
| 2010/0252776 A1 | 10/2010 | Farmayan et al. | |
| 2010/0304316 A1 * | 12/2010 | Codron et al. | 431/12 |
| 2012/0322017 A1 * | 12/2012 | Cameron et al. | 432/30 |

FOREIGN PATENT DOCUMENTS

| | | | |
|---|---|---|---|
| FR | 2 847 659 | A1 | 5/2004 |
| GB | 715958 | | 9/1954 |
| GB | 983499 | A | 2/1965 |
| GB | 998 129 | A | 7/1965 |
| JP | 57082408 | A * | 5/1982 |
| JP | 62080208 | A * | 4/1987 |
| WO | WO 99/26020 | | 5/1999 |
| WO | WO 2004/094797 | A2 | 11/2004 |
| WO | WO 2005/083130 | | 9/2005 |
| WO | WO 2010/133476 | A1 | 11/2010 |
| WO | WO 2011/065907 | A1 | 6/2011 |

OTHER PUBLICATIONS

European Search Report for EP11 17 1403, Date of Mailing: Sep. 13, 2011, Authorized Officer: Cosmin Catana, 5 pp.
G. Bisio, Energy Savings in Blast Furnace Regenerators, Proceedings Intersociety Energy Conversion Engineering Conference, Jan. 1, 1989, pp. 75-80, vol. 4, University of Genova, Genoa, Italy.
I. J. Cox, The Effect of Blast Furnace Gas Quality and Combustion Controls on Hot Blast Stove Performance, AISE Steel Technology, May 1, 2003, pp. 37-41, vol. 80, No. 5, AISE, Pittsburgh, PA, USA.
(w/Intern Search Report), Feb. 17, 2011.
(w/English abstract).
(w/Intern Search Report), May 10, 2012.
International Search Report PCT/SE2010/051301, Date of Mailing: Feb. 17, 2011, Authorized Officer: Johan Kjellgren, 5 pp.
International Search Report PCT/US2012/022293, Date of Mailing: May 10, 2012, Authorized Officer: Blaine R. Copenheaver, 9 pp.
w/Intern Search Report, Nov. 18, 2011.
no English Translation available.
European Search Report for EP11 250 727, Date of Mailing: Nov. 18, 2011, Authorized Officer: Alexandru Gavrillu, 9 pp.
R. Van Laar, J. Barel, The Future of Hot Blast Stoves, Aistech: Iron and Steel Technology Conference Proceedings, May 3, 2010, pp. 587-595, Pittsburgh, PA.
W. Kowalski et al., Optimierung der Brenner von Winderhitzern im Hinblick auf einen hohen co-Ausbrand, Nov. 1, 1990, pp. 41-50, Stahl and Eisen, Verlag Stahleisen, Dusseldorf, Germany.
w/Intern. Search Rpt., May 30, 2012.
International Search Report for PCT/US2012/025865, Date of Mailing: May 30, 2012, Authorized Officer: Blaine R. Copenheaver, 10 pp.
(w/EP Search Report), Sep. 21, 2001.
R. Van Laar, J. Barel, The Future of Hot Blast Stoves, AISTech 2010 Proceedings of the Iron & Steel Technology Conference, May 3-6, 2010, pp. 587-595, vol. 1, Pittsburgh, PA, U.S.A.

* cited by examiner

HEATING APPARATUS

BACKGROUND OF THE INVENTION

The present invention relates to apparatus for heating a blast furnace stove having a combustion region and a combustion gas outlet associated with the combustion region.

Blast furnaces are primarily but not exclusively used for the reduction of iron oxide ore to molten iron. The purpose of blast furnace stoves is to provide the blast furnace with a consistent hot-blast temperature, at a desired flow rate, in a safe and environmentally responsible manner over a protracted period of many years. The operation of a blast furnace stove is in principle simple. An air-fuel burner is typically used to burn a fuel gas (typically, predominantly blast furnace gas) and the combustion products are passed through a large mass of refractory brick that captures the sensible heat of the combustion product. Once the refractory bricks have reached the desired operating temperature the burner is shut down and cold air is passed through stove, passing over the bricks, so as to be preheated before being sent to the blast furnace as the hot-blast air. Typically, the stoves are operated in banks of three or four so that some stoves are being heated while others are providing hot blast to the blast furnace.

The blast furnace stoves may have any of a number of different configurations. Typically, each stove comprises a first vertical chamber in which combustion takes place along side a second vertical chamber in which the refractory bricks are located. Such a stove is often referred to as being of the external combustion chamber kind. Stoves in which the combustion region is housed in the refractory chamber are also known. These are called "internal" combustion stoves. In another configuration, the combustion chamber is placed on top of the refractory chamber, typically being located within a dome-shaped structure.

In current practice, there are three main approaches to try to maximise the amount of heat that can be transferred from the stove to the hot-blast. Providing a hot-blast with as high a heat content as possible reduces the coke rate for iron-making in the blast furnace. To achieve a high hot-blast temperature, the refractory or checker bricks in the stoves need to be heated to as high a temperature as is possible within the physical constraints set by the permissible dome temperature of the stove. In consequence, the calorific value of the fuel gas delivered to the burner must be capable of generating a suitably hot flame.

Blast furnace top-gas (often referred to as blast furnace gas) is conventionally the primary fuel used to heat the blast furnace stoves, but the use of this fuel has the drawback that its calorific value is variable, being strongly dependent upon the blast furnace operating practices. The variability of the blast furnace gas' calorific value is such that it is well known to blend the blast furnace gas with a higher calorific value fuel gas such as coke oven gas, converter gas or natural gas, in order to boost its heating value and generate the required flame temperature. It is alternatively known to preheat the fuel gas and air upstream of combustion by the stove burner. Indeed, the combustion gas exiting the stoves during the heating cycle typically has a temperature between 250° and 400° C. and contains about 18% of the energy input to the stoves. In some plants, this relatively hot flue gas is routed to a waste heat recovery unit where a portion of its sensible heat content is capture and used to perform the preheating. Another alternative method of heating the blast furnace stoves is to enrich the combustion air with oxygen. Adding oxygen to replace part of the combustion air increases the flame temperature as, at constant total molecular oxygen flow, the nitrogen ballast in the combustion products is reduced. Commonly, oxygen enrichment of the air is used to facilitate a reduction in the amount of coke oven, converter or natural gas needed to generate the desired flame temperature.

It is desirable to improve the operation of blast furnace stoves but in a flexible manner that is able to take account of changes in the availability and cost of fuel and other gases during an operating campaign.

SUMMARY

According to the present invention there is provided apparatus for heating a blast furnace stove having a combustion region and a combustion gas outlet associated with the combustion region, the apparatus comprising:

a) a source of lower calorific value fuel;
b) a first pipeline operable to distribute the lower calorific value fuel from the source thereof to the combustion region;
c) a source of air;
d) a second pipeline operable to distribute the air from the source thereof to the combustion region;
e) a source of oxidant comprising at least 85% by volume of oxygen;
f) a third pipeline operable to distribute the oxidant from the source thereof to the combustion region;
g) a fourth pipeline operable to conduct combustion gas from the combustion gas outlet away from the stove; and
h) a fifth pipeline operable to return a portion of the combustion gas to the combustion region.

The term "combustion gas" is meant to include the gaseous product of combustion.

The apparatus according to the invention is capable of operation in a plurality of different modes, according to the second, third and fifth pipelines that are selected for communication with the combustion region. The most important of these modes is one in which the oxidant comprising at least 85% by volume of oxygen is a sole oxidant used to support combustion and combustion gas is recirculated to the combustion region via the fifth pipeline. A number of advantages can be obtained by operating in this mode. First, desired flame temperatures can be achieved simply by using blast furnace gas as the fuel gas without enrichment with a higher calorific gas such as coke oven gas or natural gas. Second, recycle of the combustion gas makes possible a net reduction in the rate at which carbon dioxide is evolved. Third, advantages analogous to those obtained from the oxygen-enrichment of air (see above) can be obtained.

The apparatus according to the invention may be operated with recovery of heat from the combustion gas by passing said gas through a heat recovery heat exchanger.

The recirculation of combustion gas to the combustion region dilutes the mixture of fuel and oxidant therein and hence modifies the temperature and reducing the risk of damage to the materials of the stove as a result of the combustion. The combustion may in fact be flameless.

The apparatus according to the invention gives the operator of the blast furnace the flexibility to switch to conventional operation employing air to support combustion and raising the calorific value of a blast furnace fuel by employing in addition to the blast furnace fuel a higher calorific value fuel such as coke oven gas, converter gas or natural gas.

The apparatus according to the invention may therefore include a source of higher calorific value fuel and a sixth pipeline operable to distribute the higher calorific value fuel to the combustion region.

The term "low(er) calorific value fuel" is meant to include a fuel which typically has a calorific value of 9 MJ/Nm$^3$ or less. As previously mentioned, blast furnace gas is the lower calorific value fuel that is typically used. The term "high(er) calorific value gas" indicates a gas which typically has a calorific value in excess of 9 MJ/Nm$^3$. Coke oven gas, converter gas or natural gas is a suitable higher calorific value fuel for use in the apparatus according to the invention.

If desired, the apparatus according to the invention may additionally include means for selectively introducing oxidant from the third pipeline into the second pipeline. Such an arrangement offers the operator of the blast furnace the option of operating the stove with oxygen-enriched air.

The apparatus according to the invention desirably includes a vent pipe for combustion gas, typically terminating in a stack, which vent pipe typically communicates with the fourth pipeline. When the apparatus according to the invention is operated with recirculation of combustion gas to the combustion region, venting of a portion of the combustion gas limits buildup of impurities in the circulating gas.

The source of the lower calorific value fuel gas is typically a blast furnace with which the blast furnace stove forming part of the apparatus according to the invention is associated.

The source of air is typically at least one compressor, blower or fan. The compressor is typically separate from the compressor or compressors that supply the air blast to the blast furnace.

The source of oxidant comprising at least 85% by volume of oxygen is typically an air separation plant. The oxidant may therefore comprise at least 95% by volume of oxygen. The air separation plant may, for example, separate air by fractional distillation or by pressure swing adsorption.

Each of the first to sixth pipelines may include a valve or series of valves which when open gives the desired flow and when closed prevents that flow. The valves may all be associated with a common control apparatus, which if desired may operate automatically and which may be programmable. Each of the first to the sixth pipelines may also include transmitters, safety valves and other control devices which aid the overall operation of the apparatus.

If desired, the fourth and fifth pipelines may both communicate with means for treating the combustion gas. The treatment of the combustion gas may comprise recovery of waste heat from it, or recompression, or both. The apparatus according to the invention may therefore comprise a heat exchanger for recovering waste heat from the combustion gas, and a blower or compressor for passing combustion gas from the fourth pipeline to the fifth.

BRIEF DESCRIPTION OF THE DRAWINGS

The apparatus according to the invention will now be described by way of example with reference to the accompanying drawings, in which.

The drawings are not to scale. Various transmitters, safety valves and other control devices, all well known in the art of gas supply, are omitted from the drawings.

DETAILED DESCRIPTION OF PREFERRED EMBODIMENTS

Figure 1:
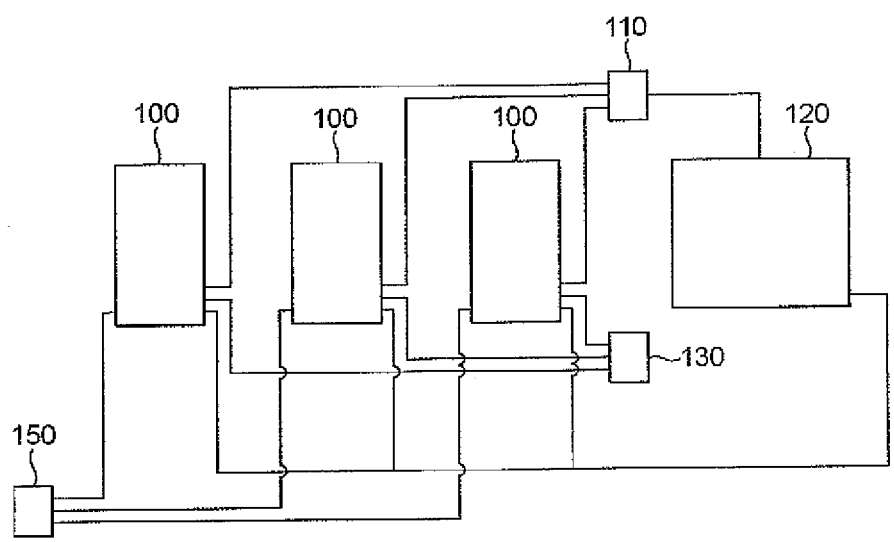
FIG. 1 is a simplified illustration of a blast furnace and its associated stoves in a conventional iron works.

Referring to FIG. 1, there is shown schematically an arrangement of a blast furnace 120 and three stoves 100 in an iron works. The operation of the blast furnace 120 produces molten iron by reduction of iron oxide with carbon provided by materials such as coke. The reduction of the iron oxide ore to iron causes the formation of carbon monoxide and a gas mixture comprising carbon monoxide, carbon dioxide and nitrogen flows from the top of the blast furnace 120 to a fuel supply control device 110 which controls the supply of the blast furnace top gas to each one of three blast furnace stoves 100. Each stove 100 has a chamber for the combustion of the top gas from the blast furnace 120 and a chamber for heating an air blast. The air blast is supplied via an air supply control device 130. The chamber for heating of the air blast comprises refractory material in the form of ceramic bricks or the like, often referred to as checker work. Combustion gases from the combustion chamber of each stove 100 flow through the air heating chamber and give up heat to the refractory bricks. Typically, each stove is operated in accordance with a predetermined cycle such that at any point in time at least one of the stoves is being used to heat the air blast and the rest of the stoves are being heated by combustion of the blast furnace gas.

When the refractory bricks are being heated, the resultant combustion or flue gases are fed to a flue gas disposal device 150. The purpose of the stoves 100 is to provide the blast furnace 120 with a consistent hot-blast temperature, at a desired blow rate over a protracted period of many years. It is well known in the art to control the combustion so as to obtain a consistent stove performance, to reduce energy consumption and to promote both safe operation and an extended campaign life. The combustion chamber of each stove 100 is provided with a burner to effect the combustion. The refractory bricks capture the sensible heat of the combustion product. Once the checker bricks have reached the operating temperature, the burner is shut down and cold air is passed over the refractory bricks where it is preheated before being sent to the blast furnace as "hot blast" air. Typically, the stoves are operating in banks of 3 or 4 so that some stoves are being heated while others are providing hot blasts to the blast furnace.

Figure 2:
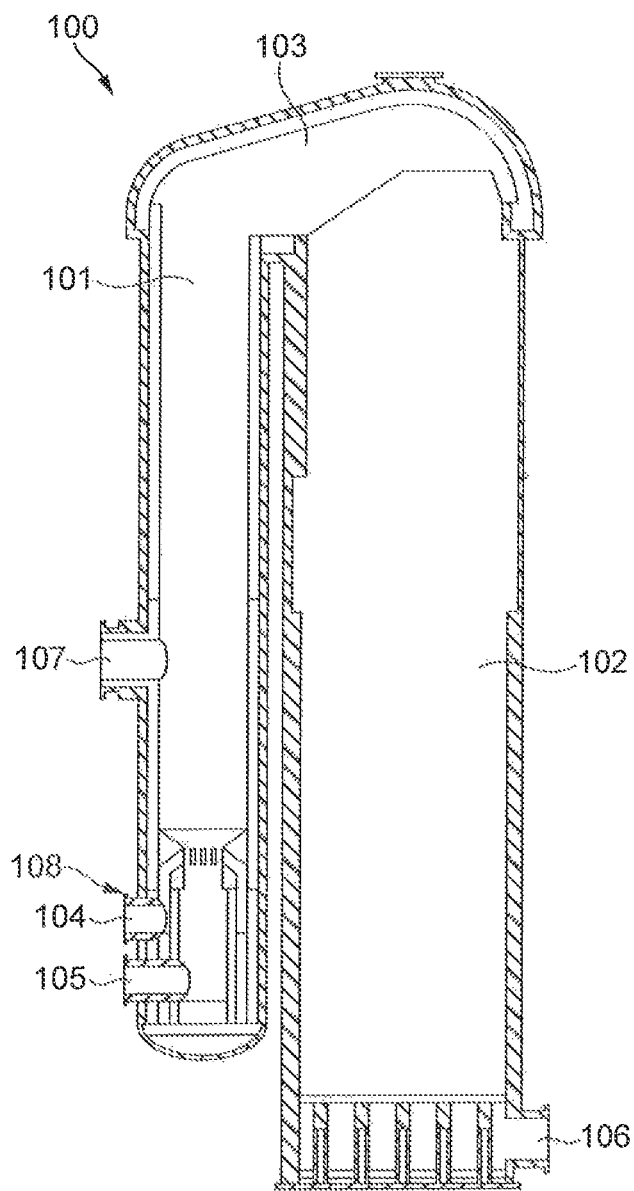
FIG. 2 is a schematic sectional drawing of a blast furnace stove having an external combustion chamber.

FIG. 2 shows a conventional Cowper stove 100 having an external combustion chamber 101, refractory material 102 and a dome 103. The stove is operated so as to ensure that the temperature of the dome 103 does not become so high that damage is caused to the stove 100. It is to be understood that there are also stoves with internal combustion chambers, and that the apparatus according to the present invention is equally applicable to the operation of such stoves.

When the refractory material is being heated, blast furnace top gas is fed to a burner 108 via a fuel inlet 105 and oxidant to the burner 108 via an oxidant inlet 104. The resulting hot combustion gases flow upwards through the chamber 101 and pass through the dome 103 and down through the chamber lined with the refractory bricks 102. As a result, the refractory bricks 102 are heated. The resulting combustion gases exit the stove 100 through a port 106. Typically the temperature of the exiting combustion gases is conventionally about 200°-350° C. When the refractory material of the bricks has reached a predetermined temperature, the operation is switched to heating the air blast. Then, air is introduced through the port 106, flowing through the chamber lined with the refractory bricks 102. As a result, the air is heated. The heated air flows though the dome 103, the combustion chamber 101 and out through an outlet port 107. At this point, the blast air typically has a temperature of 1100-1200° C. The top gas is preferably taken from a blast furnace to which blast air is provided from the stove 100. This allows for the arrangement for the stoves 100 near the blast furnace 120, is energy efficient and helps to make it possible to reduce total emissions from the plant.

The blast furnace top gas typically has a calorific value of about 3.2 MJ/Nm$^3$. If desired, an alternative low calorific value fuel may be used instead.

In general, if air is supplied as the oxidant to the burner 108 in each stove difficulties can arise in obtaining flame temperature sufficiently high to heat the air to the required blast temperature.

In order to provide additional heat, the blast furnace gas is supplemented with a fuel gas of higher calorific value. Typically coke oven gas is used for this purpose, but other gases such as converter gas or natural gas can be used instead. The amount of higher calorific value gas that is used is less than that necessary to raise the calorific value of the blast furnace gas to 9 MJ/Nm$^3$.

Various techniques are available for reducing the amount of higher calorific fuel gas that needs to be added. In one example, the relatively hot flue gas from the stoves, which typically has a temperature between 250° and 450° C., is passed to a waste heat recovery unit where a portion of its sensible heat content is captured and used to preheat the fuel gas prior to combustion by the stove burners.

In a second methodology, an oxidant containing at least 85% by volume of oxygen (typically at least 95% by volume of oxygen) is used to replace part of the combustion air. This replacement has the effect of increasing the flame temperature as, at constant total oxygen flow, nitrogen ballast in the combustion products is reduced. If the permissible dome temperature of the stove has not been reached, a higher flame temperature can be exploited to reduce the amount of higher calorific value gas that needs to be added in order to generate the desired flame temperature. Although the desired flame temperature can be maintained at reduced flow rate of higher calorific value gas by virtue of the oxygen enrichment, the energy input to the stoves tends to be reduced. In practice, this is remedied by increasing the flow of blast furnace gas to the stove burner. The higher mass flow rate of blast furnace gas compensates for the reduced air mass flow. As a result, convective heat transfer conditions within the stoves are not seriously effected.

There is, however, a practical limit to the amount of oxygen enrichment than can be used in a stove (that is based on current technology) before the flame temperature becomes too high, typically risking damage to the refractory bricks and to the dome of the stove.

According to co-pending international patent application PCT/SE2010/051301, the entire contents of which is incorporated herein by reference, the use of the higher calorific value gas may be eliminated altogether by employing an oxidant comprising at least 85% oxygen instead of air and causing combustion gases to be recirculated into the combustion region of the stove. The recirculated combustion gases dilute the mixture of fuel and oxidant sufficiently for the combustion not to cause damage to the materials of the stoves. In fact, the combustion may if desired be flameless. Typically, about one third of the combustion gases generated in the stoves is so recirculated. Although operation with recirculated combustion gases and an oxidant containing at least 85% by volume of oxygen is quite different from operation with the use of air to support combustion and without recirculation of combustion gases, relatively little modification is required of a conventional blast furnace stove to accommodate the change. Typically, the fuel gas will still flow through the existing fuel gas ports and the recirculated combustion gases and the oxidant containing at least 85% by volume of oxygen would be premixed to form a "synthetic air" which can be introduced through the existing air ports. In all cases, the total mass flow through the stoves is maintained at or very close to the mass flow for the conventional air-fuel operation. Although the quantity of blast furnace gas increases, there is a corresponding reduction in the flow of other gases into the stoves with the result that the overall mass flow is not substantially altered.

The formation of a "synthetic air" comprising recirculated combustion gases and oxidant containing at least 85% by volume of oxygen may form a gas mixture which, in comparison with air, has a relatively high concentration of oxygen. If desired, those parts of the necessary gas pipeline for handling such a gas mixture may be formed of materials such as copper or other materials which are safe for the use with oxygen. Alternatively, if it is wished to avoid having to form the inlet pipe to the "synthetic air" ports of such material, some of the oxygen may be introduced into the combustion chamber via one or more lances.

Figure 3:
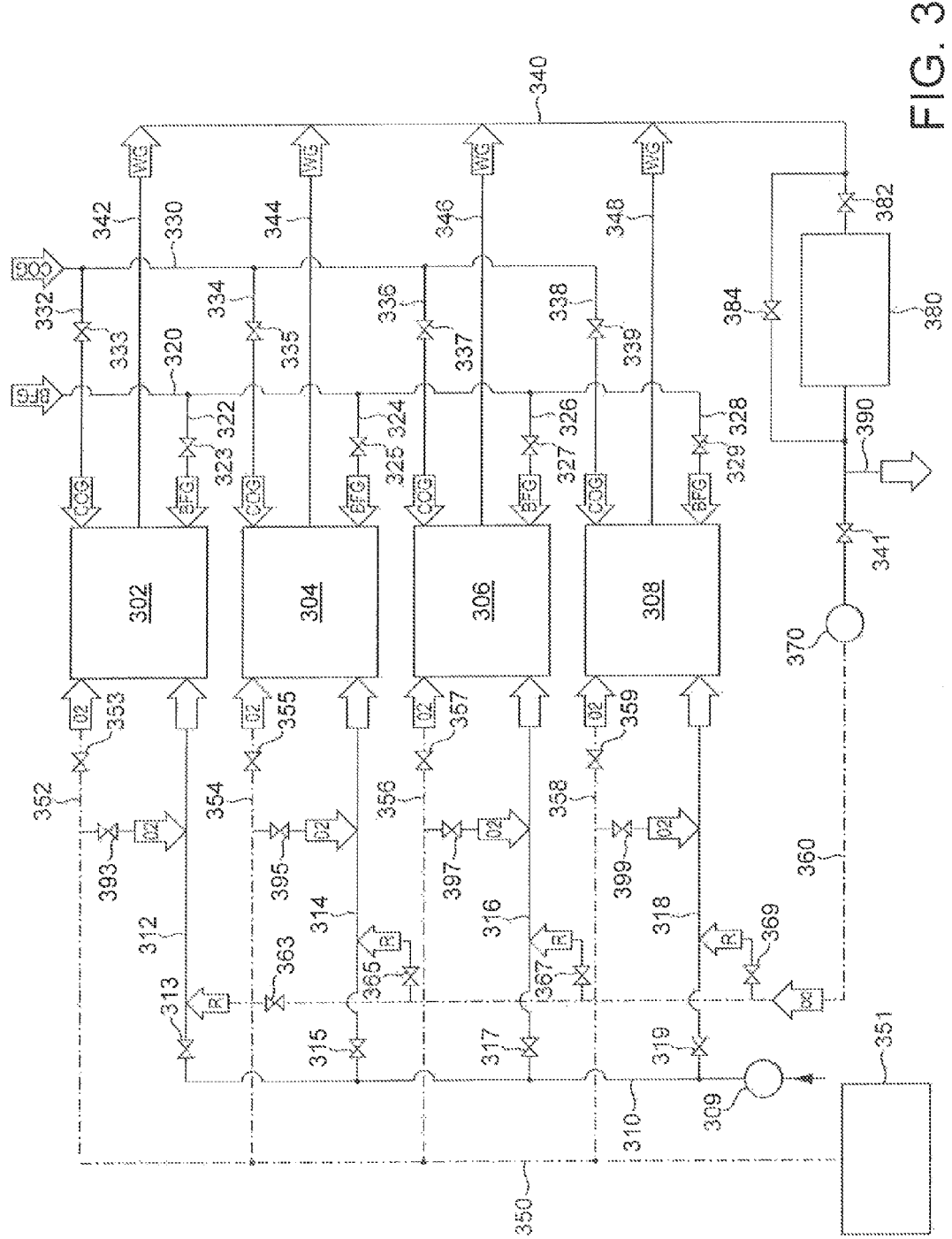
FIG. 3 is a schematic flow diagram illustrating an apparatus of the invention for operation of blast furnace stoves.

Blast furnaces are conventionally operated continuously for a period of several years. During the period of such an operating campaign, the cost and availability of the various feeds to the blast furnace and to the blast furnace stoves may vary. Accordingly, although it is believed by us that operation with recirculation of combustion gases is generally desirable, an operator of a blast furnace may require a certain flexibility in the way in which the blast furnace stoves are operated. The heating apparatus embodiment according to the invention provides this flexibility. An example of this apparatus is shown in FIG. 3. Various one-way valves, flow control valves and the like are omitted from FIG. 3 so as to facilitate an understanding of the inventive embodiment.

Referring to FIG. 3, a plurality of for example four blast furnace stoves 302, 304, 306 and 308 is shown. The stoves 302, 304, 306 and 308 are connected in parallel with each other. The apparatus comprises a main air pipeline 310, a main low calorific value fuel (blast furnace gas) pipeline 320, a main high calorific value fuel (coke oven gas) pipeline 330, a main combustion gas pipeline 340, a main oxygen pipeline 350 and a main recycle gas pipeline 360. The pipelines are associated with gas headers or distributors (not shown) which afford appropriate communication between the various pipelines and the inlets and outlets to the stoves, these inlets and outlets being essentially similar to those of the stove shown in FIG. 2. Thus, the main air inlet pipeline 310 receives air from a compressor 309 and communicates with the respective inlet ports of the stoves 302, 304, 306 and 308 via distribution pipes 312, 314, 316 and 318, respectively. Blast furnace gas is distributed from the main blast furnace gas pipeline 320 to the stoves 302, 304, 306 and 308 via blast furnace gas distribution pipes 322, 324, 326 and 328, respectively. Similarly, coke oven gas or other high calorific value fuel may be distributed to the stoves 302, 304, 306 and 308 via coke oven distribution pipes 332, 334, 336 and 338, respectively. Combustion gases flow out of the stoves 302, 304, 306 and 308 through combustion gas distribution pipes 342, 344, 346 and 348 respectively, all of which communicate with the main combustion pipeline 340.

The pipeline 340 terminates in a recycle gas blower 370 and extends through an operational waste heat recovery unit 380. Intermediate a waste heat recovery unit 380 and the recycle gas blower 370 there is a vent pipeline 390 which leads waste gas to a stack (not shown) for discharge to the atmosphere.

The outlet of the blower 370 communicates with the combustion gas recirculation pipeline 360. The recirculation gas pipeline 360 is connected to each of the air distribution pipes 312, 314, 316 and 318. The main oxygen pipeline 350 can supply oxygen produced in air separation plant 351 to each of the distribution pipes 312, 314, 316 and 318. Alternatively or additionally, it can supply the oxygen directly to the stoves 302, 304, 306 and 308 via oxygen distribution pipes 352, 354, 356, 358 respectively.

If desired, a by-pass pipe may be used allowing the combustion gases of the pipeline 340 to by-pass the waste heat recovery unit 380. The waste heat recovery unit 380 is typically arranged to transfer heat from the combustion gas to the gas air fed to the blast furnace.

The apparatus shown in FIG. 3 is capable of being operated in a plurality of different modes, which have been described above. These modes include:

a) with blast furnace gas, high calorific value fuel gas, for example, coke oven gas, and air supplied to the stoves, but without oxygen supply combustion gas recycle and waste heat recovery from the combustion gas;

b) as (a), but with waste heat recovery with the combustion gas;

c) as (b), but with oxygen-enrichment of the air, and without high calorific value fuel gas supply;

d) with blast furnace supply, oxygen supply and combustion gas recycle but without air supply, without high calorific value gas supply and without waste heat recovery from the combustion gas;

e) as (d), but with waste heat recovery from the combustion gas; and f) as (e), but with air supply as well.

Example (f) above is essentially similar to example (e) but without total replacement of the combustion air with oxygen and recirculated combustion gas, the combustion air only being partially replaced with these gases.

The source of oxygen is preferably an air separation plant producing oxygen of at least 95% purity and typically at least 99.9% purity.

To enable the apparatus to be operated in any one of the above mentioned modes, an array of on/off valves is provided. Referring again to FIG. 3, there are provided of supply valves 313, 315, 317 and 319 in the pipelines 312, 314, 316 and 318 respectively; high calorific value fuel gas (coke oven gas) distribution valves 333, 335, 337 and 339 in the high calorific value fuel gas pipes 332, 334, 336 and 338 respectively; a recycle gas shut off valve 341; main oxygen supply valves 353, 355, 357 and 359 in the oxygen supply pipes 352, 354, 356 and 358 respectively; oxygen enrichment valves 393, 395, 387 and 399 operable to enrich in oxygen the air flowing through the pipes 312, 314, 316 and 318 respectively; recirculated gas valves 363, 365, 367 and 369 communicating with the pipes 312, 314, 316 and 318 respectively; a waste heat recovery valve 382 and a waste heat recovery unit by-pass valve 384.

The above mentioned valves can be opened and closed in order to operate the illustrated apparatus in any one of the modes according to examples (a)-(f) above so as to heat the stoves. The necessary valve positions are provided in Table 1 one below. Typically, only one (or possibly two) of the stoves is heated at any one time.

In example (c) in Table 1, in addition to enriching the air in oxygen through valves 393, 395, 397 and 399 according to which of the stoves is being heated, oxygen may optionally be lanced directly into the stoves 302, 304, 306, 308, in which case valves 353, 355, 357 and 359 are opened.

It is to be appreciated that the apparatus may be operated in modes other than (a)-(f) described above. For example, waste heat recovery may be employed in all modes, not just in (b) and (c).

Some illustrative operating parameters are given for the modes of operation (a)-(e) in Table 2.

It can be seen that there is no need for the blast furnace gas to be supplemented with coke oven gas in example (c)-(e). Examples (d) and (e) are preferred to example (c) because of the higher carbon dioxide content of the stack gas if the carbon dioxide is to be captured or recovered.

A particular advantage of operating in mode (d) is that a rate at which nitrogen molecules enter the stoves is less than in other of the modes, thereby resulting in reduced formation of oxides of nitrogen. Even when the apparatus shown in FIG. 3 is operated with a recycle, there should be no need to subject the combustion gas to chemical treatment to remove oxides of nitrogen.

TABLE 1

| | Valves Open | | | |
|---|---|---|---|---|
| Example | Stove 302 being heated | Stove 304 being heated | Stove 306 being heated | Stove 308 being heated |
| a) | 313 | 315 | 317 | 319 |
| | 323 | 325 | 327 | 329 |
| | 333 | 335 | 337 | 339 |
| | 384 | 384 | 384 | 384 |
| b) | 313 | 315 | 317 | 319 |
| | 323 | 325 | 327 | 329 |
| | 333 | 335 | 337 | 339 |
| | 382 | 382 | 382 | 382 |
| c) | 313 | 315 | 317 | 319 |
| | 323 | 325 | 327 | 329 |
| | (353) | (355) | (357) | (359) |
| | 393 | 395 | 397 | 399 |
| | 382 | 382 | 382 | 382 |
| d) | 323 | 325 | 327 | 329 |
| | 353 | 355 | 357 | 359 |
| | 363 | 365 | 367 | 369 |
| | 393 | 395 | 397 | 399 |
| | 341 | 341 | 341 | 341 |
| | 384 | 384 | 384 | 384 |
| e) | 323 | 325 | 327 | 329 |
| | 353 | 355 | 357 | 359 |
| | 363 | 365 | 367 | 369 |
| | 393 | 395 | 397 | 399 |
| | 341 | 341 | 341 | 341 |
| | 384 | 384 | 384 | 384 |
| f) | 313 | 315 | 317 | 319 |
| | 323 | 325 | 327 | 329 |
| | 353 | 355 | 357 | 359 |
| | 363 | 365 | 367 | 369 |
| | 393 | 395 | 397 | 399 |
| | 341 | 341 | 341 | 341 |
| | 384 | 384 | 384 | 384 |

TABLE 2

| | a) | b) | c) | d) | e) |
|---|---|---|---|---|---|
| Blast Furnace Gas Nm³/h | 44370 | 54461 | 64000 | 64000 | 64000 |
| Blast Furnace Gas Temperature. ° C. | 120 | 215 | 215 | 120 | 120 |
| Coke Oven Gas Nm³/h | 3100 | 1457 | 0 | 0 | 0 |
| Coke Oven Gas Temperature. ° C. | 5 | 5 | — | — | — |
| Air Flow Nm³/h | 43000 | 39095 | 28000 | 0 | 14000 |
| Air Temperature ° C. | 120 | 215 | 215 | — | 120 |
| Oxygen Flow Nm³/h | 0 | 0 | 1900 | 8000 | 5250 |
| Oxygen Temperature ° C. | — | — | 20 | 20 | 20 |
| Flue Gas Recycle | 0 | 0 | 0 | 12987 | 4000 |
| Flue Gas Temperature ° C. | — | — | — | 300 | 300 |

TABLE 2-continued

|  | a) | b) | c) | d) | e) |
|---|---|---|---|---|---|
| Flame Temperature ° C. | 1444 | 1453 | 1456 | 1460 | 1448 |
| Heat of Combustion GJ'h | 184 | 182 | 181 | 181 | 182 |
| Stack Gas Oxygen Content % | 1 | 0.5 | 0.5 | 1 | 1 |
| Stack Gas CO2 Content % | 23.5 | 28 | 32 | 43.5 | 37 |

The invention claimed is:

1. An apparatus for heating a blast furnace stove having a combustion region (101) and a combustion gas outlet (106) associated with the combustion region, the apparatus comprising:
- a) a source of lower calorific value fuel;
- b) a first pipeline (320) operable to distribute the lower calorific value fuel from the source thereof to the combustion region;
- c) a source of air;
- d) a second pipeline (310) operable to distribute the air from the source thereof to the combustion region;
- e) a source of oxidant (351) comprising at least 85% by volume of oxygen;
- f) a third pipeline (350) operable to distribute the oxidant from the source thereof to the combustion region;
- g) a fourth pipeline (340) operable to conduct combustion gas from the combustion gas outlet away from the blast furnace stove;
- h) a fifth pipeline (360) operable to return a portion of the combustion gas to the combustion region; and
- i) means (393) for selectively introducing the oxidant from the third pipeline (350) into the second pipeline (310) for the oxidant to be distributed with the air into the combustion region (101).

2. The apparatus of claim 1, further comprising a vent pipe in communication with the fourth pipeline.

3. The apparatus of claim 1, wherein the source of lower calorific value fuel is a blast furnace with which said blast furnace stove is associated.

4. The apparatus of claim 1, wherein the source of air is at least one compressor.

5. The apparatus of claim 1, further comprising a source of higher calorific value fuel and a sixth pipeline operable to place the source of higher calorific value fuel in communication with the combustion region.

6. The apparatus of claim 5, wherein each one of the first to sixth pipelines comprises a valve operable to selectively provide a desired communication or prevent communication of its respective fluid flowing therein.

* * * * *